Feb. 11, 1947.  R. C. WEBB  2,415,469
ELECTRICAL CONTROL APPARATUS
Filed Feb. 25, 1943

Figure 2:
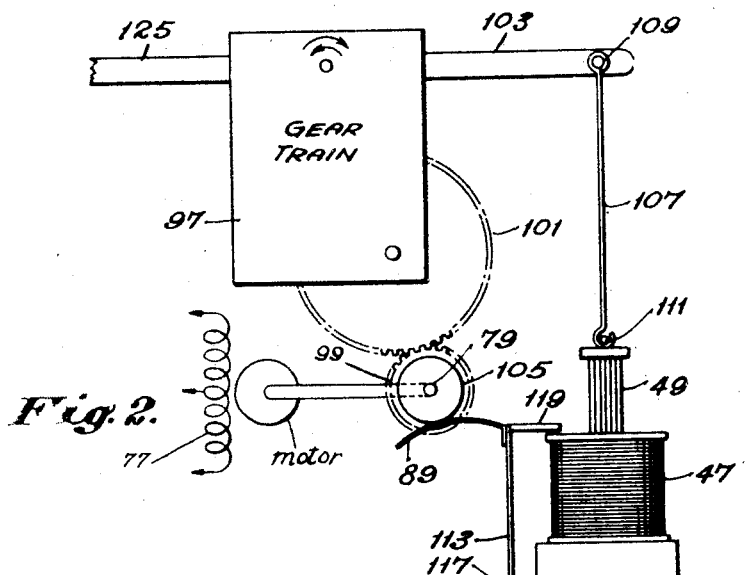

Friction drive between 105 and 89 (Fig. 2)

Linkage 103,107 between 97 and 49 (Fig. 2)

INVENTOR:
Richard C. Webb
by Samuel B. Smith
ATTORNEY.

Patented Feb. 11, 1947

2,415,469

UNITED STATES PATENT OFFICE 2,415,469

ELECTRICAL CONTROL APPARATUS

Richard C. Webb, La Fayette, Ind., assignor to Purdue Research Foundation, West Lafayette, Ind., a corporation of Indiana Application February 25, 1943, Serial No. 477,075

8 Claims. (Cl. 172—239)

This invention is directed to electrical control apparatus, and particularly to that type of device or system used for controlling apparatus responsive to proportional movements.

Furthermore, the present invention is particularly directed to an electro-mechanical type of device used in cooperative relationship with an electrical circuit particularly adapted to receive frequency modulated energy.

In connection with arrangements of the general type shown and described in applications of A. L. G. de Bey, Serial No. 369,216, filed December 9, 1940, and Serial No. 471,315, filed January 5, 1943, provision was made for transmitting frequency modulated or frequency shifted energy in order to establish a co-ordinated motion between a remotely guided airplane and a ground station. Under such circumstances, the arrangements heretofore suggested provided for transmitting radiant energy, as frequency modulations, where the frequency change would be proportional to a desired angular change in either or both the vertical or horizontal flight path of an aircraft for instance. Under these conditions, the frequency shift or change usually results from the manipulation of a control element at the ground station which is intended to produce signals to guide the aircraft in its azimuthal orientation (assuming the flight path to be horizontal), so that the aircraft could be moved to the right or to the left, and then, also, by means of the same or a separate control, provision was made for varying or shifting the frequency of energy radiated from the ground station in accordance with desired altitudinal angles which the aircraft to be guided should follow. In such manner, the aircraft could be controlled both as to its angle of climb and its angle of descent as well as its path of flight from right to left, or vice versa. Provision was also made in the prior art for combining these two controls and operating the same simultaneously to provide at once the bi-directional control. When the energy so transmitted was received on or at the aircraft to be guided, provision was made for varying one or more of the flight controlling and guiding elements of the aircraft under the control of instrumentalities which would respond to the different frequencies, so that the aircraft could be guided in space completely from a remote station.

According to the prior art arrangements, the necessary discriminator circuits, adaptable for use with such control apparatus, generally speaking, were usable only in the radio frequency range, and it therefore became necessary to use special and elaborate transmitting and control equipment at the transmitting and receiving points respectively.

According to the present invention, provision is made for controlling the apparatus within the audio frequency range, and, to this end, reference may be made to my co-pending application filed February 25, 1943, as Serial No. 477,074, and entitled "Frequency discriminator." In my aforesaid application, provision is made for use of a parallel resonant combination in connection with a discriminator circuit, where the parallel resonant combination comprises shunt connected capacity and inductance elements, and where the inductance element preferably includes an iron core element which may be adjusted relative to the coil itself.

According to the present invention, provision is made for maintaining a balanced condition from the discriminator output for changes in frequency. Such a balance may be accomplished or produced, for instance, by the automatic variation of position of the iron core of the inductance element relative to the several turns thereof.

The present invention is particularly concerned with the control circuit and apparatus by which this adjustment of the inductance core, relative to the turns, may be accomplished, and whereby, in accordance with the actual shift of the iron core, the amount of movement of the controlled element may be established.

It accordingly becomes an object of this invention to provide a method and means including a suitable mechanical movement to be controlled where the actual motion derived from the electro-mechanical system or servo-mechanism is proportional to signal frequency, which frequency may be within the audio frequency spectrum.

Further objects of the invention are those of providing a simplified type of equipment including a reduced number of tubes, relays and associated devices for the receiver control unit.

Still a further object of the invention is that of providing an electro-mechanical device which will serve as a supplemental coupling between the controlled motor of the servo-mechanism and the frequency sensitive controlling circuit in such a way as to reduce the effects of hunting of the control to a minimum.

Other objects of the invention are those of providing a simplified control circuit which overcomes one or more defects known in the prior art and which, at the same time, is relatively simple to construct, easy and efficient to operate.

and which is likewise substantially foolproof during operation.

Figure 1:
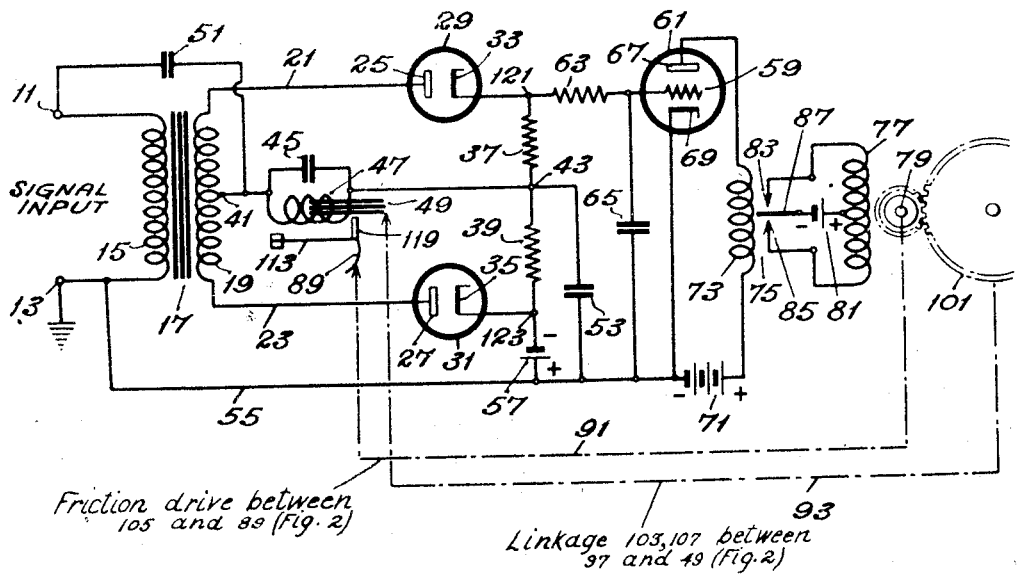

Other objects and advantages will suggest themselves to those skilled in the art when the following specification and its claims are read in connection with the accompanying drawing, in which, Fig. 1 schematically represents the electrical circuit control; and Fig. 2 is a schematic representation of one form of the electro-mechanical device for establishing the control.

Referring now to the drawing, control signal voltages for actuating the apparatus are supplied at the input terminals 11 and 13, from which such energy is fed to a discriminating network of the general character described and claimed particularly in connection with my above mentioned co-pending application entitled "Frequency discriminator," Serial No. 477,074, also filed February 25, 1943. In such a form of apparatus the input signal energy is fed through the primary winding 15 of the interstage coupling transformer 17 so as to energize the secondary winding 19 thereof. As was explained in the co-pending application mentioned, the interstage coupling transformer preferably is of the iron core type, and the arrangement, generally speaking, is particularly adapted to operation in the audio frequency range. The voltage appearing at the outer terminals of the transformer secondary 19 is then fed by way of the conductors 21 and 23 respectively to the plates or anode elements 25 and 27 of the diode tubes 29 and 31, of which the cathode elements 33 and 35 supply energy to the output resistors 37 and 39 in a manner later to be explained more fully. The transformer secondary 19 is also center tapped at 41, and from that point to the junction 43 of the resistors 37 and 39 a connection is made by way of the parallel resonant circuit including the condenser 45 and the inductance element 47 which is provided with an adjustable iron core conventionally represented at 49. The energy from the input terminal 11 is also supplied to the parallel resonant circuit 45 and 47 by way of a phase shifting element or circuit, herein conventionally represented by the condensers 51 and 53, of which the condenser 51 is connected between the input terminal 11 and one end of the resonant circuit 45—47, and the condenser 53 connects to the other end of the resonant circuit 45—47 at junction point 43 of it and the output resistors 37 and 39, and thence the circuit is back to the other input terminal 13 through conductor 55.

It is, of course, to be appreciated that the phase shifting network thus conventionally represented includes also the anti-resonant resistance of the tuned circuit comprising the inductance 47 and the condenser 45. Under such circumstances, and with this form of phase shift circuit, it is apparent that the resonant circuit portion of the discriminator is excited approximately 90° out-of-phase with the transformer secondary voltage. However, with this particular form of simplified phase shifting network, it is desirable to de-tune the parallel circuit comprising the condenser 45 and the inductance 47 very slightly from a resonance condition in order to establish exactly the 90° phase shift normally desired.

Voltage drops which occur across the diode load resistors 37 and 39 are added in series with the voltage from the bias source 57, whose polarity is preferably as indicated, and applied to the control electrode 59 of the control tube 61. The resistor 63 and the parallel condenser 65 serve to filter out the alternating current component of any voltage output which is delivered by the discriminator network.

Energizing voltage for energizing the plate or anode 67 of the control tube 61, relative to its cathode 69, is provided by way of the energy source which has been conventionally represented by the battery 71, poled as indicated, which feeds its energy to the plate or anode 67 through the winding 73 of a motor control relay conventionally represented at 75.

The winding 77 conventionally represents the differentially wound series field of an electric motor which supplies motive power to the servo-mechanism, of which the rotor shaft is conventionally designated at 79. Such a motor may be of the general type known in the art as the Selsyn or the Autosyn, for example. The series field winding 77 of the motor is arranged to be supplied with current from a source conventionally represented as the battery 81 which delivers its current through the relay contacts 83 or 85 and the armature 87, so that, depending upon which of the contacts 83 or 85 rests against the armature 87, the direction in which the motor shaft 79 is rotated will be determined.

With the arrangement as provided, the armature 87 is arranged to contact with either the contact point 83 or the contact point 85, and no intermediate position is provided. Hence, it becomes apparent that the motor shaft 79 must at all times rotate in one direction or the other.

The connections shown by dotted outline between the motor shaft 79 and an auxiliary control spring element 89 are indicated by the dot dash line 91, while the dot dash line 93 conventionally represents the control between a driven gear element 101 and the iron core 49 of the solenoid or inductance element 47. Each of these connections will be explained more particularly in connection with the showing of Fig. 2, to which reference may now be made.

When the motor, which is driven by the excitation of the series field coil 77 rotates to turn the shaft 79 in one direction or the other, it serves to drive a gear train mechanism which comprises a considerable portion of the servo-mechanism conventionally represented at 97, which driving takes place through the driving gear 99 attached to the motor shaft 79 to the driven gear 101 and thence to control, in appropriate manner, the clockwise or counter-clockwise rotation of a control arm 103. Attached also to be driven by the rotation of the motor shaft 79 is a friction contact hub conventionally represented at 105.

It now may be assumed that when the motor shaft 79 is rotated, it serves to drive and rotate the control arm 103 through the gear train 97 in order that the movement of the control arm may provide sufficient torque to do useful work, such, for example, as to move the control surfaces or elements of the airplane in flight. Thus, the airplane rudder, ailerons or other control elements may be driven and moved in accordance with the motion of the control arm 103 of the servo-mechanism, and the direction of motion will be determined in accordance with either the clockwise or the counterclockwise motion of the control arm. At the same time that the control arm is moved to control the airplane control parts (not shown), it serves also to move the movable iron or Permalloy core 49 positioned within the inductance element or coil 47, with this motion being provided by way of the control link mechanism conventionally indicated and shown at 107 to link one end 109 of the control arm to the end 111 of the Permalloy core.

An additional supplementary coupling is also maintained between the relatively high speed motor shaft 79 and the inductance element 47 by means of a relatively lightweight Permalloy vane 113 which is clamped at one end 115 in a suitable clamping mechanism, conventionally represented at 117, but arranged in a position free to vibrate at its other end. The free end of the Permalloy vane 113 is fitted with a small Permalloy extension, conventionally represented at 119, and also with a thin spring element 89, above mentioned, which preferably may be of phosphor bronze and also have substantially the arcuate shape indicated. Thus, it becomes apparent that the spring element 89 makes a friction contact with the hub 105 carried by and rotated from the motor shaft 79, so that the vane 113 of Permalloy, with its attachments, represented at 119, will be moved closer to or farther away from the Permalloy core 49 as the motor shaft 79 rotates either clockwise or counterclockwise as the case may be.

With the arrangement as it is constituted and shown, for example, by the drawing, when the frequency of the applied signal is such that the discriminator is in balance, the voltage drops across the diode load resistors 37 and 39 are equal in magnitude but opposite in polarity, with the result that the voltage difference appearing between terminal points 121 and 123 is zero, and the potential applied to the control electrode 59 of the output tube 61, relative to its cathode 69, is simply that represented by the voltage of the energy source represented as the battery 57. Under these circumstances, a normal plate current flows through the tube 61 and the adjustment of the relay winding 73 is set so that this normal current is substantially just halfway between the "pull up" and "drop out" current values for the relay armature 87.

Assume, for instance, now that the armature 87 is in the so-called "drop out" position, and that the motor battery or energy source 81 is closed through the armature 87 and the upper contact 83 to supply energy to the field winding 77, and that the motor shaft 79, under such circumstances, is caused to run in a counter-clockwise direction, it is apparent that friction between the hub 105 on the motor shaft 79 and the contact spring 89 moves the magnetic shunt, comprising the elements 113 and 119, closer to the main core 49 of the inductance coil 47, thereby to increase the inductance value of the coil. By this action, the resonant frequency of a tuned circuit, comprising the condenser 45 and the inductance 47, has been decreased and the discriminator network is unbalanced in such a direction as to make the point 121 slightly positive in potential relative to the point 123. Consequently, the grid or control electrode 59 of the tube 61 is made less negative than in the balanced condition and the plate current flowing through the tube 61 tends to increase. The result of the increase in plate current flowing in the relay winding 73 causes the armature 87 to "pull up," thus breaking the contact with the point 83 and establishing contact with the contact point 85. When this happens, the rotor shaft 79 reverses and the magnetic shunt, comprising the elements 113 and 119, is moved away from the core 49 so as to reduce the inductance value of the inductance element 47 and to raise the resonant frequency of the circuit comprising the inductance 47 and the capacity 45 to some value above the incoming signal frequency so as to cause the discriminator network to unbalance in the opposite direction. This condition makes the point 123 now slightly positive relative to the point 121, and the grid or control electrode 59 of the tube 61 is now made slightly more negative, causing the plate current flowing through the tube 61 to be reduced and the armature 87 again returned to its "drop out" position ready to repeat the cycle hereinabove explained.

When the motions above described take place, it is apparent that the frequency at which the oscillations result in the servo-mechanism will be determined largely by the mass of the moving parts, the speed at which the relay operates and the time constant of the electronic circuit. During each cycle, the rotor shaft 79 is not required to rotate more than one complete revolution which, with a very substantial gear reduction in the gear train which moves the control arm 103 makes little or no observable effect of motion of the control arm. Thus, what otherwise might tend to be the cause of serious hunting in the control arm 103 in case the magnetic shunt comprising the elements 113 and 119 were not in use, is reduced to but a very slight tendency for vibration. It is obvious that the oscillation will continue as long as the impressed signal frequency remains unchanged, and that the elements 113 and 119 will vibrate slightly relative to the core 49.

However, if it be assumed now that the signal frequency impressed at the signal input terminals 11 and 13 is now increased to a fairly substantial degree, for instance, it is made evident that the discriminator will become substantially unbalanced and the point 121 will become several volts positive relative to the point 123. In this way, the control electrode or grid 59 of the tube 61 becomes much more positive than in the condition of operation first above explained, and the plate current flowing in the tube 61 increases quite substantially to cause the armature 87 to be held over to its "pull up" position against the contact point 85. Consequently, the rotor 79 turns in a clockwise direction to first move the magnetic shunt 113 and 119 as far from the core 49 as possible, but since this does not produce sufficient reduction in the inductance, in this case the rotor or motor shaft 79 continues to turn so that now the control arm 103 is moved by means of the driven gear train 97 until the core 49 is withdrawn, to some extent, from the winding 47, because the control arm is now caused to rotate in a counter-clockwise direction and the core 49 is moved by means of the link mechanism 107. As soon as the control arm 103 is moved to this new position where the inductance 47 assumes a value to make the resonant frequency of the parallel network comprising the capacity 45 and the inductance 47 substantially resonant and equal to the new incoming frequency, the magnetic shunt effect obtained by reason of the motion of the elements 113 and 119 back and forth relative to the core 49 is again brought into effect and slight oscillations begin again with the control arm being maintained substantially in a position of rest.

From what has been above described, it is apparent that the position of the control arm 103 is made proportional to the impressed signal input frequency appearing at the input terminals 11 and 13 in order that the controlled elements (not shown), which are moved, for instance, by means of connection with the end 125 of the control arm, can be moved almost exactly in proportion to the impressed signal frequency, and retained in the position established by reason of the freedom from hunting resulting from the electro-mechanical coupling of the magnetic shunt provided by the elements 113 and 119.

In the light of the foregoing description, it is apparent that some modifications may be made in the invention without departing from either its spirit or scope, and that such changes and modifications will be clearly apparent to those skilled in the art. Included among such modifications, of course, would be that of replacing the diode tubes 29 and 31 by a single tube element or, where desired, provision might be made for controlling a capacity element in contrast to the inductance element to obtain the desired retuning effect, or an auxiliary current might be caused to flow through the inductance, thereby to vary the value of the inductance.

Accordingly, it is to be understood that the claims hereinafter presented are intended to be limited only insofar as is necessitated by what has herein been shown and/or described.

Having now described the invention, what is claimed is:

1. A control system responsive to frequency modulated signal energy comprising a detector circuit including a pair of diode elements, means to supply frequency modulated signalling energy to like electrode elements of the diodes in 180° out-of-phase relationship, means including a serially connected phase shifting network and parallel resonant circuit comprising inductance and capacity elements for also supplying to the diodes the frequency modulated signal energy at 90° out-of-phase relationship with the first supplied energy for a predetermined signal condition, so that for a predetermined frequency measured by the resonant frequency of the parallel resonant circuit the output energy flowing from each of the diodes is substantially equal, a load circuit connected to receive output energy from the diodes for unbalanced output conditions resulting from changes in the impressed frequencies, a servo-mechanism responsive to energy flowing in the load circuit for varying the value of one of the inductance and capacity elements of the resonant circuit to restore an equilibrium of output.

2. An electrical control device of the type described for establishing an output equilibrium in a discriminator network wherein is included an inductance element having an internal movable core element comprising a motor means responsive to variances in output from the discriminator and adapted to rotate upon its shaft in clockwise or counter-clockwise directions in accordance with signal outputs, a core-like element positioned adjacent the inductance element, a frictional connection between said core-like element and said driven motor shaft to position said element more closely to and more remotely from the inductance element in accordance with the direction of rotation of the said motor, and means responsive to continued rotation of the said motor to vary the position of the internal movable core element relative to the inductance in response to continued rotation of the said motor in one of its two directions so that a predetermined equilibrium output signal strength for all impressed input frequencies is produced.

3. The device claimed in claim 2 comprising, in addition, a controlled element connected to be driven from said motor element, and means to alter the position of the controlled element substantially in proportion to the angular rotation of the said motor element.

4. In a control system responsive to a frequency modulated signal energy wherein detection occurs in a pair of diode elements to which the frequency modulated input signalling energy is supplied to like electrode elements in 180° out-of-phase relationship and wherein a phase shifting network comprising parallelly connected inductance and capacity elements is provided for normally also supplying to the diodes the frequency modulated signal energy at 90° out-of-phase relationship with respect to the first applied energy, so that for a predetermined input frequency the output energy flowing from each of the diodes is substantially equal, the combination comprising a load circuit connected to receive output energy from the diodes for unbalanced output conditions resulting from changes in the impressed frequencies, a servo-mechanism responsive to energy flowing in the load circuit, and means connected to the servo-mechanism for varying the value of one of the inductance and capacity elements with changes in impressed frequencies to restore an equilibrium of output.

5. In a control system responsive to frequency modulated signal energy wherein detection occurs in a pair of diode elements to which the frequency modulated input signalling energy is supplied to like electrode elements in 180° out-of-phase relationship and wherein a phase shifting network comprising parallelly connected inductance and capacity elements is provided for normally also supplying to the diodes the frequency modulated signal energy at 90° out-of-phase relationship relative to the first applied energy, so that for a predetermined input frequency the output energy flowing from each of the diodes is substantially equal, the combination comprising a load circuit connected to receive output signal energy from the diodes, a servo-mechanism responsive to energy flowing in the load circuit for unbalanced output conditions resulting from changes in the impressed frequencies, means connected to the servo-mechanism for varying the value of one of the inductance and capacity elements with changes in impressed frequencies to restore an equilibrium of output, and control means responsive to frequency variances in impressed signals as translated through the servo-mechanism to provide proportional movement indications.

6. A proportional movement control system comprising an input circuit adapted to receive frequency modulated signalling energy at frequencies varying in either of two directions from a predetermined mean frequency value, a pair of thermionic rectifiers connected each simultaneously to receive the said impressed input frequencies in an out-of-phase relationship, a phase shifting network, and a serially connected parallel resonant circuit comprising an inductance and capacity element for simultaneously supplying the frequency modulated signalling energy to the said rectifiers with a 90° phase shift normally relative to the signalling energy directly supplied, so that for a predetermined mean frequency value a substantially balanced signal output is derived from the rectifiers, signal responsive means responding to changes in the output from the rectifiers for producing output signal energy of a value proportional to the impressed frequency, a servo-mechanism connected to rotate in clockwise and counterclockwise directions in accordance with increases and decreases from a predetermined normal signal output value, means responsive to limited rotation of the servo-mechanism in each direction for varying to a limited extent the inductance value of the inductance element of the parallel resonant network, and means responsive to continued rotation of the servo-mechanism in one of its two directions of rotation for applying a major variation in the inductance value of the said inductance element normally to restore a substantially balanced output condition from the said receiving network.

7. A proportional movement control system comprising an input circuit adapted to receive frequency modulated signalling energy at frequencies varying in either of two directions from a predetermined mean frequency value, a pair of diode rectifier devices each having a like electrode element connected to receive the said impressed input frequencies simultaneously in an out-of-phase relationship, a phase shifting network, and a serially connected parallel resonant circuit comprising an inductance and capacity element for simultaneously supplying the frequency modulated signalling energy to each of the said rectifiers with a 90° phase shift normally relative to the signalling energy directly supplied, so that for a predetermined means frequency value of input signal energy a substantially balanced signal output is derived from the rectifiers, signal responsive means responding to changes in the output from the rectifiers for producing output signal energy of a value proportional to the impressed frequency, a servo-mechanism connected to rotate in clockwise and counterclockwise directions in accordance with increases and decreases from a predetermined normal signal output value, means responsive to rotation of the servo-mechanism in each direction for varying the inductance value of the said inductance element normally to restore a substantially balanced output condition from the said receiving network, and a proportional movement control element connected to be driven from said servo-mechanism to vary its position in substantial proportion to the angular rotation of the servo-mechanism.

8. A proportional movement control system comprising an input circuit adapted to receive frequency modulated signalling energy at frequencies varying in either of two directions from a predetermined mean frequency value, a pair of diode rectifier elements each having a corresponding electrode element connected to receive the said impressed input frequencies simultaneously in an out-of-phase relationship, a phase shifting network, and a serially connected parallel resonant circuit comprising an inductance and capacity element for simultaneously supplying the frequency modulated signalling energy to each of the said rectifier elements with a 90° phase shift normally relative to the signalling energy directly supplied, so that for a predetermined mean frequency value of input signal energy a substantially balanced signal output is derived from the rectifier elements, signal responsive means responding to changes in the output from the rectifiers for producing output signal energy of a value proportional to the impressed frequency, a servo-mechanism connected to rotate in clockwise and counter-clockwise directions in accordance with increases and decreases from a predetermined normal signal output value, means responsive to limited rotation of the servo-mechanism in each direction for varying to a limited extent the inductance value of the inductance element of the parallel resonant network, means responsive to continued rotation of the servo-mechanism in one of its two directions of rotation for applying a major variation in the inductance value of the said inductance element normally to restore a substantially balanced output condition from the said receiving network, and a proportional movement controlled element connected to be driven from said servo-mechanism to indicate approximately the angular rotation thereof in each direction.

RICHARD C. WEBB.

REFERENCES CITED

The following references are of record in the file of this patent:

UNITED STATES PATENTS

| Number | Name | Date |
| --- | --- | --- |
| 1,794,932 | Usselman | Mar. 3, 1931 |
| 2,282,101 | Tunick | May 5, 1942 |